Dec. 15, 1931.  W. TRINKS ET AL  1,836,413
SHEET GLASS APPARATUS
Original Filed Dec. 3, 1928   2 Sheets-Sheet 1
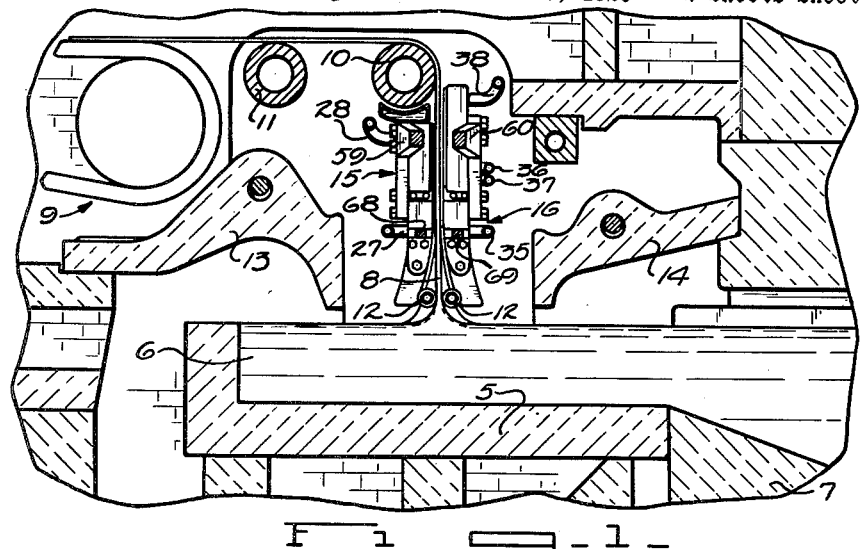
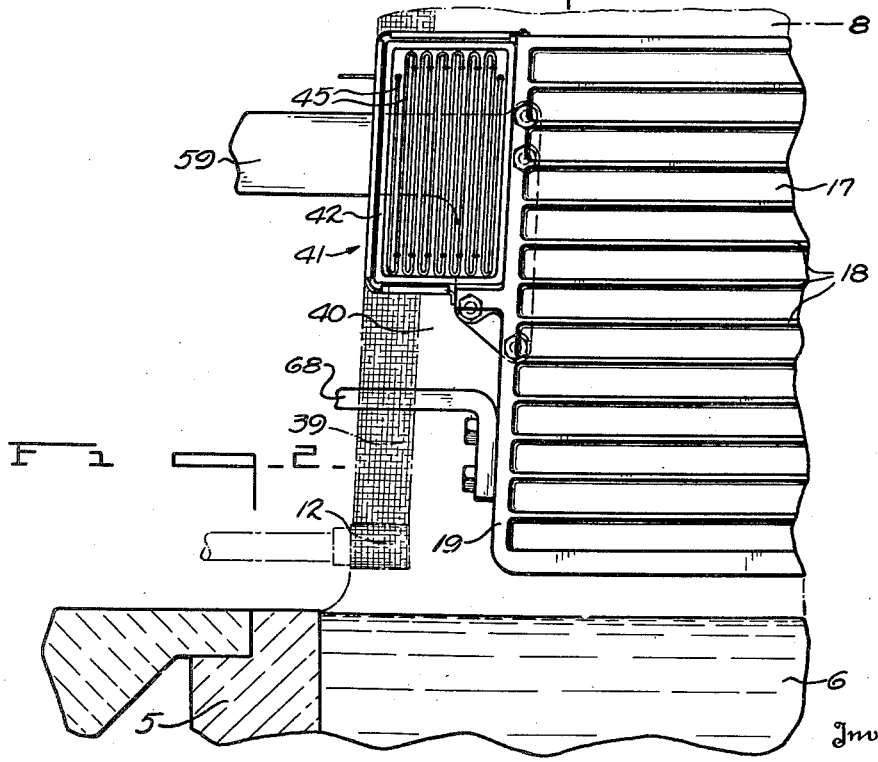
Inventor
Willibald Trinks
John D. Keller
By Frank Fraser
Attorney Dec. 15, 1931. W. TRINKS ET AL 1,836,413
SHEET GLASS APPARATUS
Original Filed Dec. 3, 1928 2 Sheets-Sheet 2
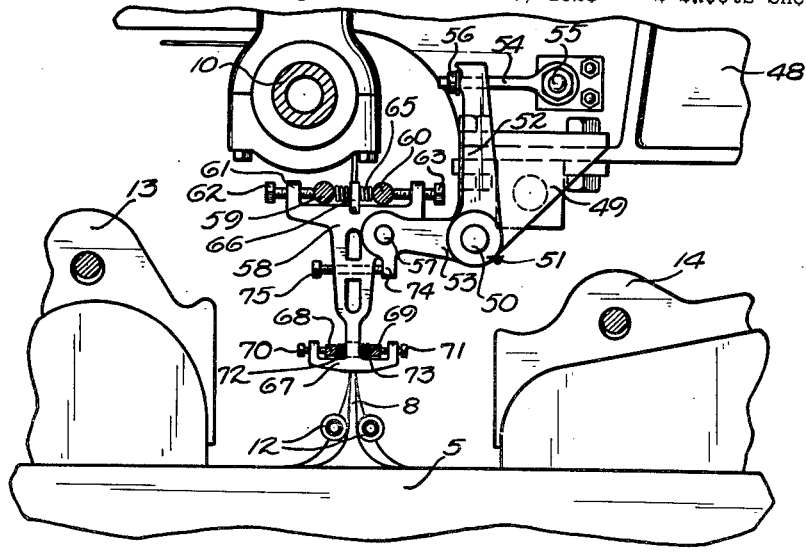
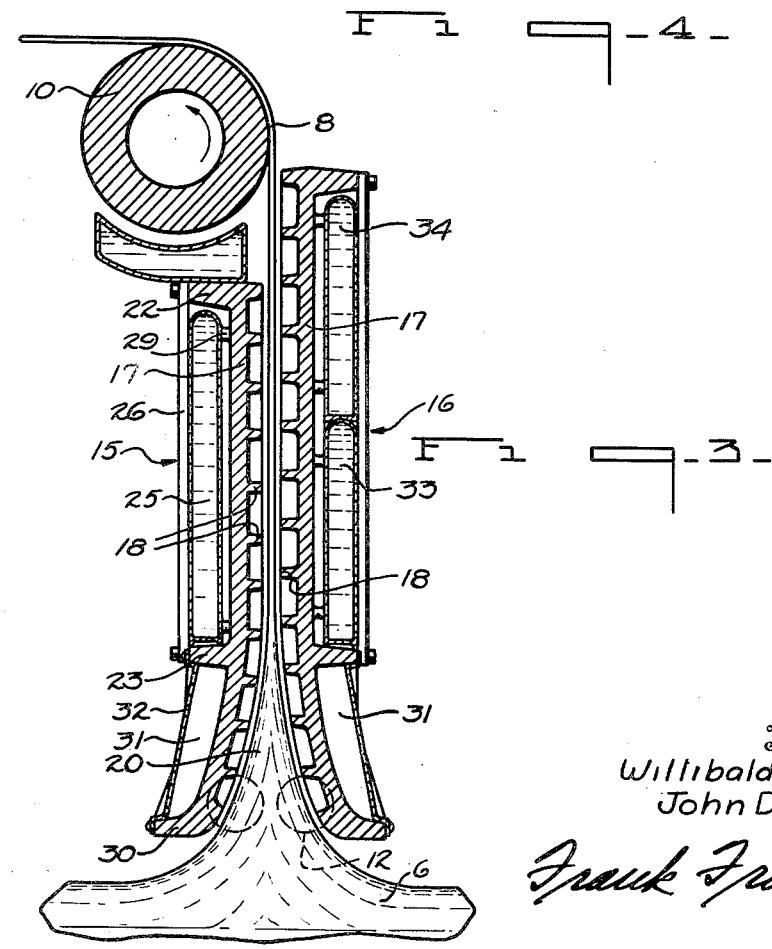
Inventor
Willibald Trinks
John D. Keller
Frank Fraser
Attorney Patented Dec. 15, 1931

1,836,413

UNITED STATES PATENT OFFICE

WILLIBALD TRINKS AND JOHN D. KELLER, OF PITTSBURGH, PENNSYLVANIA, ASSIGNORS TO LIBBEY-OWENS-FORD GLASS COMPANY, OF TOLEDO, OHIO, A CORPORATION OF OHIO

SHEET GLASS APPARATUS

Original application filed December 3, 1928, Serial No. 323,335. Divided and this application filed April 14, 1930. Serial No. 444,000.

This application is a division of our copending application entitled Sheet glass apparatus, filed December 3, 1928, Serial No. 323,335.

The present invention relates generally to the drawing upwardly of glass in flat sheet form from a bath of molten glass and more especially to the provision of improved means for shielding the sheet during its vertical draw.

In the production of sheet glass in accordance with one of the processes now in general use, the sheet is drawn upwardly from a bath of molten glass for a suitable distance and then while still in a semi-plastic condition, although substantially set in its final sheet form, is deflected into the horizontal plane and passed horizontally through an annealing leer. In such process, there is sometimes a tendency toward the formation of longitudinal waves in the sheet as the said sheet is drawn upwardly from the bath of molten glass, said waves usually appearing as vertical streaks in the sheet. The formation of these waves is believed to result principally from the setting up of convection currents in the air and gases surrounding the sheet and partially from drafts and puffs of gases issuing from the furnace. The convection currents act to chill the glass sheet unevenly and thereby cause it to draw unevenly.

An object of this invention is the provision of improved shielding means for protecting the sheet during the vertical draw, said means functioning to eliminate or break up the convection currents above described, whereby the formation of longitudinal waves in the sheet from this cause may be obviated. In addition, the shielding means serves to protect the sheet from drafts and puffs of gases from the furnace and further prevents dirt, dust and other foreign matter from coming in contact therewith. By eliminating the convection currents, the shielding means tends to render cooling and contraction of the sheet more uniform.

Another object of the invention is the utilization of means associated with the shields proper for preventing air currents from coming in contact with the backs thereof, to the end that convection air currents are not only prevented from direct contact with the glass surfaces during the drawing operation, but also wherein any possible indirect effect by uneven or streaky cooling of the rear surfaces of the shields is avoided.

A further object of the invention is the provision of electric heating means associated with the shields for heating and thus softening the thickened or knurled edge portions formed on the sheet during the drawing operation whereby to facilitate proper bending of said sheet from the vertical into the horizontal plane.

A still further object of the invention is the provision of novel means for supporting and adjusting the shields.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one type of drawing apparatus showing the improved shielding means provided by the present invention incorporated therewith, Fig. 2 is a fragmentary transverse section through the drawing apparatus showing a front elevation of a portion of one of the shields, Fig. 3 is a vertical longitudinal section through a portion of the drawing apparatus and also of the shielding means, and Fig. 4 is a side elevation, partially in section, of the supporting and adjusting means for the shields.

While, in the accompanying drawings, there is illustrated one particular type of sheet glass drawing apparatus with which the present invention might be incorporated, it is to be understood that the use thereof is not to be restricted to the particular drawing apparatus disclosed. The sheet glass drawing apparatus herein illustrated by way of example, however, includes a relatively shallow working receptacle or draw pot 5 containing a mass of molten glass 6, preferably supplied thereto from a suitable furnace 7 which may or may not be of the continuous tank type as desired. The glass sheet 8 is drawn upwardly from the surface of the molten bath 6 by means of suitable drawing mechanism illustrated diagrammatically and designated in its entirety by the numeral 9. The sheet is initially drawn upwardly for a suitable distance and then, while still in a semi-plastic condition although substantially set in its final sheet form, is deflected into the horizontal plane about bending member or roll 10, passed over an idler roll 11 and through the drawing mechanism 9 into an annealing leer, not shown. For the purpose of maintaining the sheet to width, any suitable width maintaining means may be utilized such as for instance the knurled rollers 12 which are arranged to engage opposite sides of the sheet at both edges thereof. These rollers are adapted to be positively driven and are usually positioned closely adjacent the molten bath 6. Arranged at either side of the sheet and partially covering the molten bath are lip tiles 13 and 14, which serve to direct heated gases downwardly upon the surface of the molten glass 6 to assist in properly conditioning the same.

The shields herein provided for shielding the sheet during its vertical draw are adapted to be mounted at opposite sides of sheet 8 and are designated in their entirety 15 and 16 respectively. Each shield proper consists essentially of a metallic plate 17 provided upon its inner surface with a plurality of spaced horizontal baffles or ribs 18, these baffles or ribs extending transversely of the sheet 8 and being connected at their opposite ends by substantially vertical marginal ribs 19. The upper portions of the shields proper are straight and substantially parallel with the sheet, while the lower portions thereof are curved outwardly and downwardly to conform substantially to the curvature of the sheet meniscus 20 as clearly apparent in Fig. 3.

In the case of natural convection or circulation, there is a practically stagnant layer or film of air or gas in contact with any flat surface along which convection currents are set up. This air layer or film has no motion at the solid surface, but its velocity increases as the distance from the surface increases. In the film proper, however, the rate of air flow is below the "critical velocity" and convection currents scarcely exist. The thickness of a stagnant air layer of this kind depends upon the temperature of the surface. For example, it is estimated at ¾ inch on surfaces at about 400° F. but on hotter glass surfaces it would doubtless be thinner. The shields proper are therefore adapted to be placed sufficiently close to the surfaces of the glass sheet so that the baffles or ribs 18 will be within the limit of the stagnant air layer or film in contact therewith, whereby they will prevent or break up the formation of convection currents adjacent the surfaces of the sheet. When the shields are set close enough to the sheet surfaces, the convection currents will be effectively eliminated. Furthermore, the shields, due to their close proximity to the glass sheet, will protect the same from drafts, puffs of gases issuing from the furnace and from dirt, dust and other foreign matter. The shields proper are preferably constructed of a heat resisting alloy such as nichrome, duralloy or some other similar metal.

The present invention also embodies the provision of means adapted to be associated with the shields proper in a manner to prevent air currents from coming in contact with the backs thereof. This is an important feature in that should such currents be permitted to act on the backs of the shields they are very apt to produce cold streaks in the metal and thus indirectly produce in the glass sheet those waves which it is desired to eliminate. Otherwise stated, the object is not only to avoid the direct contact of convection air currents with the glass surfaces during the drawing operation but also any possible indirect effect by uneven or streaky cooling of the rear surfaces of the shields.

This is accomplished preferably by the use of water coolers and insulation which protect the shields from any effects of variable air currents or unequal temperatures of the surroundings so that constant temperatures are assured across the full width of the sheet. Naturally, this tends to make cooling and contraction of the sheet more even which is also an important advantage. Thus, the plate 17 of shield 15 is provided at its upper end with a rearwardly extending horizontal flange 22 and adjacent its lower end with a similar rearwardly extending flange 23, which flanges are connected at their opposite ends by substantially vertical flanges 24. The several flanges 22, 23 and 24 form, in effect, a continuous flange upon the back of plate 17 creating a recess within which is arranged a cooler 25 secured in place by strips or the like 26. The cooler 25 preferably consists of a metallic casing through which is adapted to be circulated a suitable cooling medium such as water or some other liquid, this cooling medium being introduced into the casing through a pipe 27 adjacent the lower end thereof and permitted to exit therefrom through a pipe 28 adjacent its upper end. The cooler 25 is disposed in a vertical position and the inner surface thereof is substantially parallel with but spaced from the back of plate 17, this spaced relation being maintained by spacing bosses 29. The extreme lower end of the plate 17 is curved rearwardly as at 30 and disposed between this curved portion and the flange 23 is a suitable layer of insulating material 31 which forms a backing for the lower portion of the shield proper and which is held in place by a plate or the like 32. With such an arrangement, it will be readily apparent that air currents are prevented from striking directly against the back of the plate 17 so that the disadvantages incident to uneven or streaky cooling thereof are eliminated. By protecting the back of the shield proper in this maner, the temperature of the sheet can be maintained more nearly constant and uniform throughout its width.

The shield 16 is of substantially the same construction as shield 15, with the single exception that since it is of considerably greater height two superposed coolers 33 and 34 are provided instead of a single cooler. The coolers 33 and 34 are, however, similar to the cooler 25 and are mounted in the same manner with respect to the shield proper. The cooling medium for the coolers 33 and 34 is adapted to enter through pipes 35 and 36 adjacent the bottoms thereof and exit through pipes 37 and 38 adjacent the upper ends thereof. The curved lower end portion of the shield 16 is also insulated in the same manner as is shield 15.

As is well known, during the drawing of the sheet in accordance with the process herein disclosed, the knurled rollers 12 form heavy or knurled edges 39 on the sheet and adjacent which edges are thickened strips of glass 40. It is essential that these knurled edges and the thick strips of glass adjacent thereto be heated and thus softened in order to permit proper bending of the sheet from the vertical into the horizontal plane about the bending roll 10. Heretofore, gas burners have been used for this purpose, the exposed flames therefrom being directed against the edge portions of the sheet. The use of exposed flames has not been entirely satisfactory, however, the chief objection thereto being that they tend to dirty the sheet. According to the present invention, electric heaters are provided for softening the knurled edges and the thick strips of glass adjacent thereto. The electric heaters can be easily regulated to permit desired graduation of the heat and further give out a clean heat which will not dirty the sheet. It will be noted upon reference to Fig. 3, that the shields extend only across the main central body portion of the sheet and carried by each side of each shield adjacent the upper end thereof and projecting outwardly therebeyond is an electric heater designated generally by the numeral 41. These electric heaters are positioned opposite the knurled edges of the sheet and the thick strips of glass adjacent thereto. Each electric heater 41 consists of a body portion 42 carrying heater wires 45 preferably arranged in the manner shown in Fig. 2. In order to avoid hot streaks in the knurled edges of the sheet, the heater wires 45 are not exactly parallel to the line of motion of the sheet edge but preferably diverge slightly therefrom.

The improved means herein provided for mounting and adjusting the shields 15 and 16 is illustrated in Fig. 4. Carried by the framework 48 of the drawing machine, at each side of the sheet, is a fixed bracket 49 to the lower end of which is pivoted, as at 50, a bell crank lever 51 having a substantially vertical portion 52 and a substantially horizontal portion 53. Loosely received through the upper end of the substantially vertical portion 52 of bell crank lever 51 is a rod 54 secured at its inner end as at 55 and having a nut 56 threaded upon its outer end. Pivoted to the outer end of the substantially horizontal portion 53 of bell crank lever 51, as at 57, is a member 58 adapted to support upon the upper end thereof the outer ends of supporting arms 59 and 60 which arms are secured at their inner ends to the shields 15 and 16 respectively adjacent the upper ends thereof. The member 58 is provided at its upper end with upstanding ears 61 through which are horizontally threaded adjusting screws 62 and 63 bearing at their inner ends against arms 59 and 60. Compression springs 64 and 65 arranged inwardly of the arms 59 and 60 engage the same to normally urge said arms outwardly into engagement with the adjusting screws 62 and 63. The inner ends of the compression springs bear against a fixed part 66. The member 58 is provided at its lower end with a laterally extending portion 67 adapted to support thereupon the supporting arms 68 and 69 secured to the shields 15 and 16 respectively adjacent the lower ends thereof. These latter arms are maintained in position by means of the adjusting screws 70 and 71 and compression springs 72 and 73. The horizontal portion 53 of bell crank lever 51 is provided with a depending lug 74 adapted to be engaged by an adjusting element 75 passed transversely through the member 58.

By the provision of the supporting and adjusting means above described, the shields are capable of a plurality of adjustments. Thus, by rotating the nuts 56 at the opposite sides of the machine, the bell crank levers 51 can be rocked about their pivots 50 to raise or lower the members 58 and consequently the shields 15 and 16. The opposite ends of the shields are independently adjustable but the corresponding ends of the two shields are movable as a unit. Upon rotation of the adjusting elements 75, which bear against the depending lugs 74, the members 58 can be rocked about their pivot points 57 to vary the angle of the shields with respect to the sheet. Likewise, by properly adjusting the set screws 62, 63, 70 and 71, the shields may be moved independently of one another inwardly or outwardly relative to the sheet 8.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In sheet glass apparatus, the combination with means for drawing a sheet vertically from a mass of molten glass, of a pair of shields arranged at opposite sides of the sheet, means for supporting said shields, and means for independently adjusting the opposite ends of the shields vertically with respect to said sheet, said adjusting means moving the corresponding ends of the two shields as a unit.

2. In sheet glass apparatus, the combination with means for drawing a sheet vertically from a mass of molten glass, of a pair of shields arranged at opposite sides of the sheet, means for supporting said shields, means for adjusting the shields vertically, and means for moving the shields as a unit to vary the angle thereof with respect to said sheet.

3. In sheet glass apparatus, the combination with means for drawing a sheet vertically from a mass of molten glass, of a pair of shields arranged at opposite sides of the sheet, means for supporting said shields, means for independently adjusting the opposite ends of the shields vertically with respect to said sheet, said adjusting means moving the corresponding ends of the two shields as a unit, and means for moving the shields as a unit to vary the angle thereof with respect to said sheet.

4. In sheet glass apparatus, the combination with means for drawing a sheet vertically from a mass of molten glass, of a pair of shields arranged at opposite sides of the sheet, common means for supporting the corresponding ends of the shields, and means for independently adjusting the supporting means at opposite ends of said shields for moving the shields vertically as a unit.

5. In sheet glass apparatus, the combination with means for drawing a sheet vertically from a mass of molten glass, of a pair of shields arranged at opposite sides of the sheet, common means for supporting the corresponding ends of the shields, and means for moving said supporting means to move the shields as a unit to vary the angle thereof with respect to said sheet.

6. In sheet glass apparatus, the combination with means for drawing a sheet vertically from a mass of molten glass, of a pair of shields arranged at opposite sides of the sheet, common supporting means for the corresponding ends of the shields, means for independently adjusting the supporting means at opposite ends of said shields for moving the same vertically as a unit, and means for moving said supporting means to move the shields as a unit to vary the angle thereof with respect to said sheet.

7. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, and means for moving the members vertically to raise and lower the corresponding ends of the shields as a unit.

8. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, and means for swinging the members about their pivots to move the shields as a unit to vary the angle thereof with respect to said sheet.

9. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, means for moving the members vertically to raise and lower the corresponding ends of the shields as a unit, and means for swinging the supporting members about their pivots to move the shields as a unit to vary the angle thereof with respect to said sheet.

10. In sheet glass apparatus, the combination with means for drawing a sheet vertically from a mass of molten glass, of a pair of substantially vertically disposed shields arranged at opposite sides of the sheet, a substantially vertically disposed member at each end of the shields for supporting the said shields adjacent their upper and lower ends, and means carried by said supporting members for moving the shields bodily toward and away from the sheet.

11. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, means for moving the members vertically to raise and lower the shields as a unit, and means carried by the supporting members for moving the shields bodily toward and away from the sheet.

12. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, means for swinging the members about their pivots to move the shields as a unit to vary the angle thereof with respect to said sheet, and means carried by the supporting members for moving the shields bodily toward and away from the sheet.

13. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, means for pivotally mounting said members, means for moving the members vertically to raise and lower the corresponding ends of the shields as a unit, means for swinging the supporting members about their pivots to move the shields as a unit to vary the angle thereof with respect to said sheet, and means carried by the supporting members for moving the shields bodily toward and away from the sheet.

14. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, a pivotally mounted lever to which each supporting member is pivoted, means for rocking the levers to raise and lower the shields vertically as a unit, and means carried by the members and engaging the levers for swinging said members about their pivots to move the shields as a unit to vary the angle thereof with respect to said sheet.

15. In sheet glass apparatus, the combination with means for drawing a sheet vertically from a mass of molten glass, of a pair of shields arranged at opposite sides of the sheet, a substantially vertically disposed member at each end of the shields for supporting the corresponding ends thereof, a pivotally mounted lever to which each supporting member is pivoted, means for rocking the levers to raise and lower the shields vertically as a unit, means carried by the members and engaging the levers for swinging said members about their pivots to move the shields as a unit to vary the angle thereof with respect to said sheet, and means carried by the supporting members for moving the shields bodily as a unit toward and away from the sheet.

Signed at Pittsburgh, in the county of Allegheny, and State of Pennsylvania, this 5th day of April, 1930.

JOHN D. KELLER.
WILLIBALD TRINKS.